(12) United States Patent
Fullan et al.

(10) Patent No.: US 7,497,404 B1
(45) Date of Patent: Mar. 3, 2009

(54) PIPING SUPPORT DEVICE

(76) Inventors: Peter Fullan, 14 Gail Dr., North Massapequa, NY (US) 11758; Theresa Fullan, 14 Gail Dr., North Massapequa, NY (US) 11758

( * ) Notice: Subject to any disclaimer, the term of this patent is extended or adjusted under 35 U.S.C. 154(b) by 0 days.

(21) Appl. No.: 11/539,461

(22) Filed: Oct. 6, 2006

(51) Int. Cl.
*F16L 3/00* (2006.01)

(52) U.S. Cl. .......................... 248/49; 138/108; 138/172; 248/59

(58) Field of Classification Search .................. 248/49, 248/56, 65, 73, 74.1, 68.1, 58, 59; 138/108, 138/172; 174/481; 52/232
See application file for complete search history.

(56) References Cited

U.S. PATENT DOCUMENTS

| | | | |
|---|---|---|---|
| 4,004,768 A * | 1/1977 | Evans et al. .................... 248/59 |
| 4,338,485 A | 7/1982 | Fullenkamp et al. |
| D295,521 S | 5/1988 | Mockett |
| 5,098,047 A * | 3/1992 | Plumley ..................... 248/68.1 |
| 5,217,191 A * | 6/1993 | Smith .......................... 248/55 |
| 5,354,952 A | 10/1994 | Hickey |
| 5,488,198 A | 1/1996 | Kramer |
| 5,560,397 A | 10/1996 | Miller et al. |
| 5,743,302 A * | 4/1998 | McNeely ..................... 138/113 |
| 5,752,679 A * | 5/1998 | Thomason .................... 248/49 |
| 6,235,988 B1 | 5/2001 | Karst et al. |
| 6,240,689 B1 * | 6/2001 | Haddad et al. ................. 52/298 |
| 6,343,771 B1 * | 2/2002 | Simon .......................... 248/49 |
| 6,896,004 B1 * | 5/2005 | Witzel ......................... 138/112 |
| 6,945,735 B1 * | 9/2005 | Doverspike .............. 405/184.4 |
| 2003/0182881 A1 * | 10/2003 | Denier et al. ............... 52/220.7 |
| 2005/0061925 A1 * | 3/2005 | Kirschner ..................... 248/49 |

FOREIGN PATENT DOCUMENTS

DE 4309330 A1 * 6/1994
JP 6-74368 * 8/1992

* cited by examiner

*Primary Examiner*—Ramon O Ramirez
(74) *Attorney, Agent, or Firm*—Advantia Law Group; Michael W. Starkweather; Jason P. Webb

(57) ABSTRACT

A piping support device for supporting piping for conduit. The device includes: a hollow cylindrical member with a low aspect ratio and a first aperture therethrough; a first bracket and second bracket, each coupled to the cylindrical member and extending outwardly along a side of the cylindrical member; a first set screw, with setting and operation ends, disposed through the aperture and external to the cylindrical member. Additionally, there is a second set screw disposed through a second aperture in the cylindrical member, wherein the second aperture is radially distanced from the first aperture at an angle greater than about ninety degrees. Moreover, the device has a first coupling portion coupled to the cylindrical member and a second coupling portion, with a plurality of holes, extending from the first coupling portion substantially normal to the first coupling portion. Further, first coupling portion is shorter than the second coupling portion.

6 Claims, 1 Drawing Sheet

PIPING SUPPORT DEVICE

BACKGROUND OF THE INVENTION

1. Field of the Invention

The present invention relates to devices for supporting pipes and the like, specifically a piping support device for supporting piping for conduits.

2. Description of the Related Art

In the related art, it has been known for construction workers, electricians, cable television installers, etc. to use devices or mechanisms to support, and facilitate safe installation and/or reinstallation of piping that house conduit for electrical power conductors in the walls of buildings. Non-limiting examples of such conductors include cables, wires, etc. Current devices for supporting piping in the marketplace do not significantly reduce the amount of time and energy its takes to reinstall piping that have fallen from building walls. Some improvements have been made in the field. Examples include but are not limited to the references described below, which references are incorporated by reference herein:

U.S. Pat. No. 6,235,988, issued to Karst et al., discloses a wall panel assembly for use in an office environment includes a wireway which is attached to a wall panel. The wireway includes two side walls, a top wall, a bottom wall and a raceway defining a conduit for electrical power conductors. The raceway is positioned between the side walls and extends between and interconnects the top wall and the bottom wall. The raceway structurally supports the wireway.

U.S. Pat. No. 4,338,485, issued to Fullenkamp et al., discloses a headwall unit for patient-care rooms has a skeletal framework which supports slidable cover panels. The cover panels are held in place by a removable vertically elongate portion of the framework. When the vertically elongate portion is released, the cover panels can be easily removed to provide access to the interior of the unit for installation or maintenance.

U.S. Pat. No. 5,488,198, issued to Kramer, discloses a device for protecting wires and tubes that must be placed thru the apertures in building panels or studs made of steel or the like. The device includes a single piece, plastic body having a wall surface which is bowed on opposing sides and flanged along its periphery. On opposing sides of the outer surface of the body's wall is arranged a single protruding ridge or a plurality of protruding, angled pins or male nubs which securely hold, in the gap formed between the wall flange and the ridge/male nubs, the opposing rims of an aperture in a metal stud that this device is designed to be securely attached to. The body of this device can be of any size or shape, including but not limited to square, rectangular, oval or cathedral shaped. Due to its elasticity and larger than aperture size, this device can be pinched in along the opposing bowed sides of the body's wall and upon release an outward pressure is achieved against the rims of the stud aperture. The design of the protruding male nubs in relation to the wall flange allows this device to remain firmly attached to the aperture once it is attached thereto.

U.S. Pat. No. 5,354,952, issued to Hickey, discloses an electric wiring system comprising a plurality of electrical members including at least one wire and one enclosure to make a connection between the wire and one of the members, and a conduit support bracket. The enclosure having walls perpendicular to each other with one wall having at least one entrance for the wire. The conduit support bracket having a plate member attached at one end to one of the walls of the enclosure while supporting conduits adjacent its second end.

U.S. Pat. No. 5,560,397, issued to Miller et al., discloses a conduit assembly which has an inner sleeve and outer sleeve which are proportioned to be concentrically mounted, each of which has a longitudinal slot of approximately the same width is disclosed. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slop is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

U.S. Patent Application Publication No.: 2003/0182881, by Denier et al., discloses a bracket for supporting an electrical junction box within a wall frame. The bracket has a junction box support portion adapted to be connectable to the electrical junction box and a cable support portion extending from the junction box support portion. The cable support portion has a cable securing portion that receives and automatically secures the electrical cables in the cable support portion, thereby fixing the electrical cables a desired distance from the junction box.

U.S. Design Pat. No. D295,521, issued to Mockett, discloses the ornamental design for a conduit for wires or the like.

The inventions heretofore known suffer from a number of disadvantages which include being difficult to mount on a wall structure, impractical, expensive, heavy in weight and/or cumbersome.

What is needed is a piping support device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available piping support devices. Accordingly, the present invention has been developed to provide a piping support device for supporting piping for conduit.

In one embodiment of the present invention, there is a piping support device for supporting piping for conduit. The device may include: a cylindrical member that may be hollow, may have a low aspect ratio (small depth as compared to width), and/or may include a first aperture therethrough; and/or a first bracket that may be coupled to the cylindrical member along a side of the cylindrical member and/or may extending outwardly therefrom; and/or a second bracket that may be coupled to the cylindrical member along a side of the cylindrical member and/or may extend outwardly therefrom; and/or a first set screw that may be disposed through the aperture, the set screw may have a setting end and/or may have an operation end, wherein the operation end may be external to the cylindrical member.

In another embodiment, the piping support device may include a second set screw that may be disposed through a second aperture, through the cylindrical member, wherein the second aperture may be radially distanced from the aperture at an angle greater than about ninety degrees. In addition, the device may include a first bracket that may have: a first coupling portion that may be coupled to the cylindrical member and/or a second coupling portion that may extend from the first coupling portion and may be substantially normal to the first coupling portion.

In still yet another embodiment, the device may include a second coupling portion that may have a plurality of holes therethrough. Moreover, there may be a first coupling portion that may be shorter than the second coupling portion.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
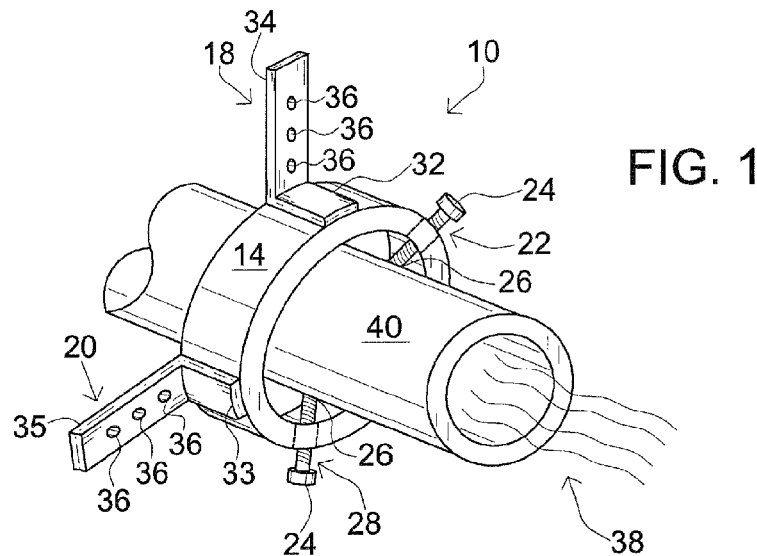
FIG. 1 is a front perspective view of a piping support device, according to one embodiment.
Figure 3:
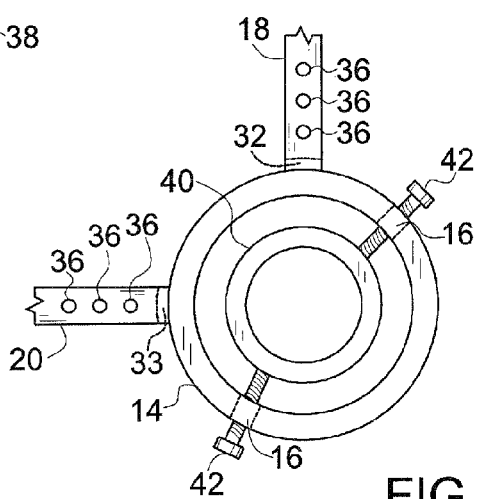
FIG. 3 is a front elevational view of a piping support device, according to one embodiment.
Figure 2:
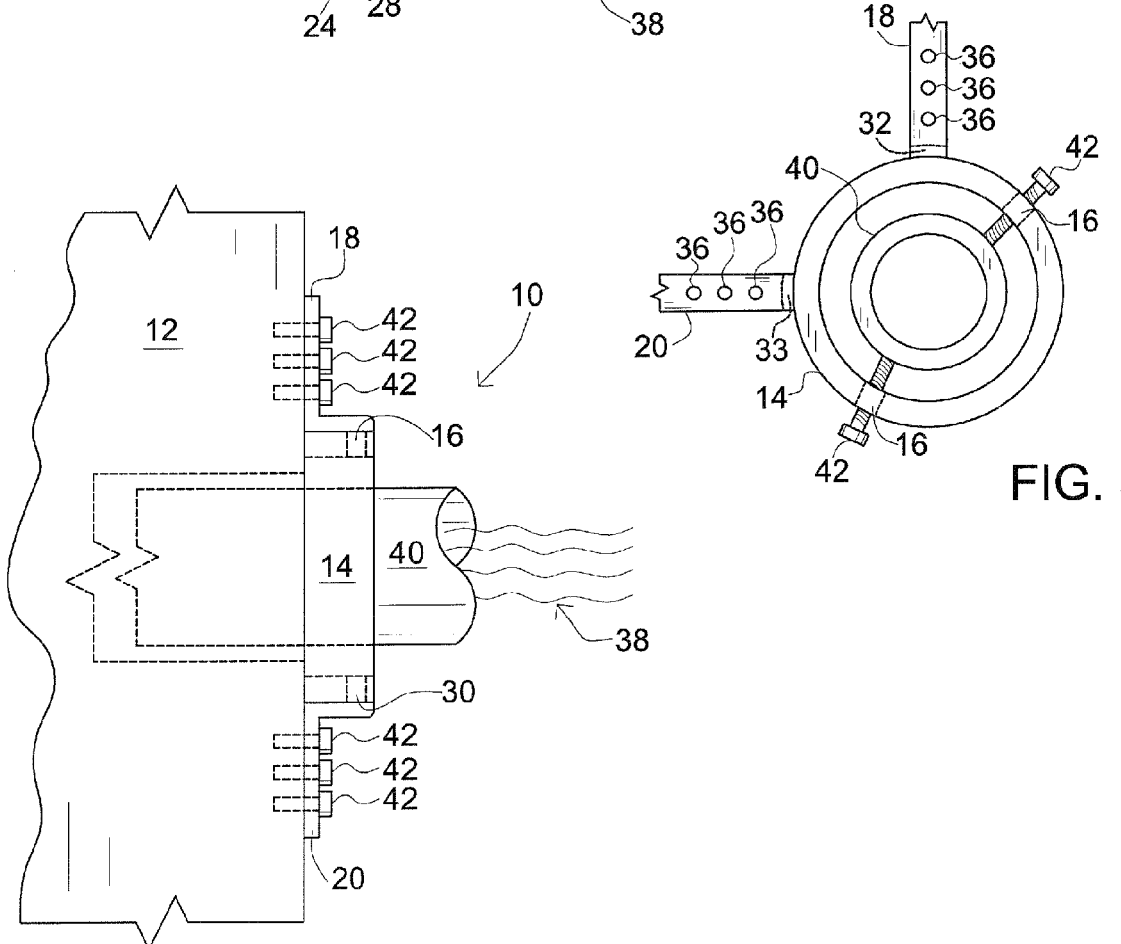
FIG. 2 is a side view of a piping support device coupled to a wall, according to one embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Looking to the figures, there is an embodiment of a piping support device 10 used to support piping 40 that houses conduit 38 (also referred as wires) for electrical power conductors in the interior of a building wall 12. The illustrated embodiment includes: a hollow cylindrical member 14 having a low aspect ratio (small depth as compared to width) and first aperture 16 therethrough; and a first bracket 18 and second bracket 20 each coupled to, and along a side of the cylindrical member and extending outwardly therefrom. In addition, there is a first set screw 22, adjustably disposed through the first aperture, having a setting end 24 and operation end 26 external to the cylindrical member.

In another embodiment, the piping support device 10 may include a second set screw 28 disposed through a second aperture 30, through the cylindrical member 14, wherein the second aperture may be radially distanced from the first aperture 16 at an angle greater than about ninety degrees. In yet another embodiment, the device 10 includes a first bracket 18 having: a first coupling portion 32 coupled to the cylindrical member; and a second coupling portion 34 with a plurality of holes 36 therethrough. The second coupling portion may extend from the first coupling portion, be substantially normal to the first coupling portion; and may be larger than the first coupling portion. The setting end 24 and operation end of screws 22, 28 are configured for a user to adjustably stabilize piping in the interior of the cylindrical member.

In still yet another embodiment, the device 10 includes a second bracket 20 radially distanced from the first bracket 18 at angle about ninety degrees or greater, enabling the device to mounted to narrow beams in order to support the piping 40 during initial stages of building construction projects. The second bracket 20 includes a first coupling portion 33 coupled to the cylindrical member; and a second coupling portion 35 with a plurality of holes 36 therethrough. The second coupling portion 35 may extend from the first coupling portion 33, be substantially normal to the first coupling portion 33; and may be larger than the first coupling portion 33.

In operation, a user doing construction work in a building could removably couple the device 10 to a vertical wall 12 by using a hammer and/or screwdriver to insert nails and/or screws 42 through holes 36 in brackets 18, 20. The user then can insert piping 40 through cylindrical member 14 and mate a screwdriver with setting end 24 of set screws 22, 28. This enables the user to adjustably screw the set screws 22, 28, through apertures 16, 30, into the cylindrical member 14 until the operation end 26 of set screws 22, 28 are engaged with piping 40, thereby stabilizing the position of piping 40 therein. Afterwards, the user can feed wires 38 through the interior of piping. Upon completion of construction jobs, the user can use a hammer and/or screwdriver to decouple the device from the wall. The user could then repeat the process throughout a building structure as required.

The present invention fulfills the need for a better method of installing devices that support conduit and piping as it passes through the wall 12 of a building. The piping support device 10 is easy to install, light in weight, relatively small in size, and inexpensive. By using the device, users no longer have to waste a substantial amount of time during a work day reinstalling piping material that have fallen from a wall 12.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although the figures illustrate an embodiment of the present invention including a hollow cylindrical shaped member 14, one skilled in the art would know that the piping support device 10 may include hollow member(s) of different shapes. For example, cubical, etc.

It is envisioned that the diameters of the apertures 16, 30 and holes 34 may vary according to various embodiments.

It is also envisioned that the second aperture 30 may be radially distanced from the first aperture 16 by various angles greater than 90 degrees, according to various embodiments.

In various embodiments, the distances and/or intervals between the holes 36 in the brackets 18, 20 may differ.

It is expected that there could be numerous variations of the design of this invention. An example is that the length, width, volume, etc. of the cylindrical member 14; brackets 18, 20; set screws 22, 28; setting end 24; operation end 26; and/or coupling portions 32, 34 may vary.

Finally, it is envisioned that the components of the device may be constructed of a variety of metallic and/or non-metallic materials. For example, metal, aluminum, copper, metal alloys, composite material, plastic, polymer, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A piping support device for supporting piping for conduit, comprising:
    a cylindrical member being hollow, having a low aspect ratio, and including a first aperture therethrough;
    a first bracket coupled to the cylindrical member along a side of the cylindrical member and extending outwardly therefrom; wherein the first bracket includes a first coupling portion coupled to the cylindrical member and a second coupling portion extending from the first coupling portion substantially normal to the first coupling portion;
    a second bracket coupled to the cylindrical member along a side of the cylindrical member and extending outwardly therefrom;
    a first set screw disposed through the aperture, the set screw having a setting end and an operation end, the operation end external the cylindrical member; and
    a second set screw disposed through a second aperture through the cylindrical member, wherein the second aperture is radially distanced from the aperture at an angle greater than about ninety degrees.

2. The piping support of claim 1, wherein the second coupling portion includes plurality of holes therethrough.

3. The piping support of claim 2, wherein the first coupling portion is shorter than the second coupling portion.

4. A piping support device for supporting piping for conduit, consisting essentially of:
    a cylindrical member being hollow, having a low aspect ratio, and including a first aperture therethrough;
    a first bracket coupled to the cylindrical member along a side of the cylindrical member and extending outwardly therefrom; wherein the first bracket includes a first coupling portion coupled to the cylindrical member and a second coupling portion extending from the first coupling portion substantially normal to the first coupling portion;
    a second bracket coupled to the cylindrical member along a side of the cylindrical member and extending outwardly therefrom; wherein the second bracket is radially distanced from the first bracket at angle about ninety degrees or greater;
    a first set screw disposed through the aperture, the set screw having a setting end and an operation end, the operation end external the cylindrical member; and
    a second set screw disposed through a second aperture through the cylindrical member, wherein the second aperture is radially distanced from the aperture at an angle greater than about ninety degrees.

5. The piping support of claim 4, wherein the second coupling portion includes plurality of holes therethrough.

6. The piping support of claim 5, wherein the first coupling portion is shorter than the second coupling portion.

* * * * *